March 25, 1930.    J. A. HARRIS    1,751,734
STEAM MOTOR VEHICLE
Filed Feb. 11, 1927    2 Sheets-Sheet 1
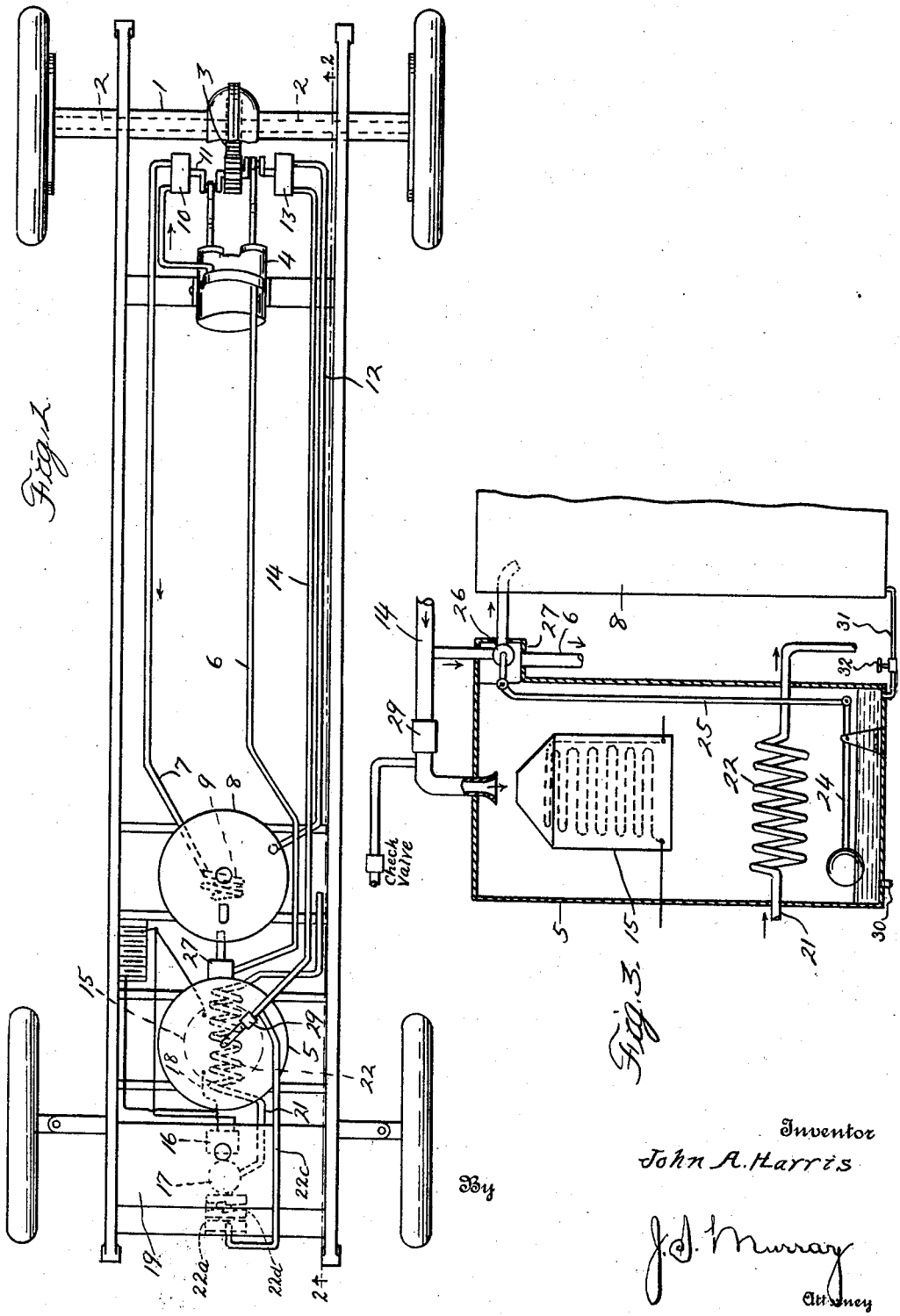
Inventor
John A. Harris
By
J. A. Murray
Attorney March 25, 1930.          J. A. HARRIS          1,751,734
                         STEAM MOTOR VEHICLE
                         Filed Feb. 11, 1927          2 Sheets-Sheet 2

Patented Mar. 25, 1930

1,751,734

UNITED STATES PATENT OFFICE

JOHN A. HARRIS, OF DETROIT, MICHIGAN

STEAM MOTOR VEHICLE

Application filed February 11, 1927. Serial No. 167,389.

This invention relates to motor vehicles and relates particularly to steam propelled motor vehicles.

An object of the invention is to provide means upon a vehicle for electrically generating steam for use in propelling the vehicle, and to generate the electrical energy for making steam independently of the vehicle propelling means.

Another object is to provide means upon a motor vehicle for generating electrical energy and for using the electrical energy to generate steam and for employing the steam to propel the vehicle, the electric generator being driven by an internal combustion engine and the exhaust of said engine being utilized to supplement the electrical energy in making steam.

A further object is to utilize the exhaust steam in a steam propelled vehicle for preheating the water from which the steam is generated.

A still further object is to provide a steam propelled vehicle having improved means for automatically regulating the water delivery to the boiler.

It is also an object of the invention to adapt a steam propelled vehicle to employ a rear axle of substantially the form standardized for use in gas driven vehicles.

These and various other objects the invention attains by the construction hereinafter described and illustrated in the accompanying drawings, wherein:—

Figure 1 is a plan view of a vehicle embodying the improved construction.

Figure 2 is a side view of the same.

Figure 3 is a detailed sectional view of the boiler showing the automatic water-feed regulator.

In these views the reference character 1 designates a rear axle housing, and 2 a pair of live axle members adapted to be driven by a differential gearing 3, arranged in the mid-portion of said housing as is common practice.

A steam engine 4 of any suitable construction and mounted in any suitable manner has a drive connection to the axle. The boiler 5, mounted preferably upon the front portion of the vehicle, is adapted to deliver steam to the engine 4 through a pipe 6, and the exhaust from said engine carried through a pipe 7 preferably discharges in the lower portion of a water tank 8, mounted adjacent to said boiler, being condensed through the cooling action of the water in said tank. In order to increase the transfer of heat from the exhaust steam pipe 7 to the water, said pipe is formed with one or more coils 9 in the tank 8 below the water level therein. To minimize any possible back pressure in said exhaust pipe it is preferred to positively propel the steam through said pipe as for example by a suitable rotary pump 10, which may be directly connected to the engine crank shaft 11.

From the lower portion of the tank 8 water is delivered through a pipe 12 to a pump 13, from which it is supplied to the top portion of the boiler through a feed pipe 14. The pump 13 may be of a high pressure rotary type having a suitable drive from the engine 4.

As illustrated the two pumps 10 and 13 are driven from opposite ends of the crank shaft 11.

The boiler 5 is adapted to be electrically heated, a suitable electrical heater 15 being arranged in the upper portion of said boiler, below the outlet of the boiler feed pipe 12. 16 designates an ordinary electric generator driven by an internal combustion engine 17 and suitably connected to the electric heater 15 to energize the latter as indicated at 18. As shown the engine 17 is mounted forwardly of the boiler beneath a reservoir 19 of fuel for said engine, a suitable shield 20 being arranged above said engine in spaced relation to the bottom of the reservoir, 19, to avoid undue heating of said reservoir by the engine.

The heat of the exhaust gases from said engine is utilized to supplement the electric heater 15 in making steam. Thus an intermediate portion of the exhaust conduit 21 of said engine forms coils 22 in the lower portion of the boiler.

The engine 17 is preferably also utilized to drive a pump 22ª supplied with water from the tank 8 through a pipe 22ᵇ and being adapted to deliver such water to the boiler through a suitable connection 22°. A clutch 22ᵈ controlling the drive connection to said pump from the engine may be closed to give the boiler its water supply for initially steaming up, and may be opened upon energizing the engine 4 which drives the main water feed pump.

In the case of any generation of steam pressure in the water tank a check valve 23 in the top of said tank will open to relieve such pressure.

It is preferred to maintain no reserve of water in the boiler, all of the water being flashed into steam by the heater 15 as fast as it is delivered to the boiler. As a provision for automatically limiting the level of any water that may accumulate in case of an over-supply, a float arm 24 is pivoted in the lower portion of the boiler and is connected by a push rod 25 to a valve 26 located in an offset 27 from the upper portion of the boiler and controlling a by-pass leading from the water-feed pipe 14 to the water-tank 8. Between the connection of said by-pass with the feed pipe and the outlet of said feed pipe to the boiler a check valve 29 is arranged in the feed pipe to resist any back flow of steam through the feed pipe. When the water level rises in the boiler to a pre-determined extent the valve 26 is opened and the feed pipe discharges back to the water tank instead of to the boiler.

To eliminate the possibility of the valve 26 being held open through water accumulated in the boiler, at starting, a drain cock 30 permits any such accumulation to be drained out. Also as another provision for removing any accumulated water from the boiler a pipe connection 31 controlled by a valve 32 is provided between the bottom of the boiler and the water tank, so that when the valve 32 is opened, the steam pressure in the boiler will force any accumulation through said pipe and into the water tank. Preferably the pipe 31 has an upward extention 33 within the water tank rising above the water level therein so as to avoid a flow from the water tank to the boiler when there is no steam pressure in the latter.

Among the advantages of the described vehicle is the fact that the various pumps and the generator are driven independently of the rear axle, thus permitting the latter to be of a standard construction.

It is also a feature of the invention that no condenser is required in view of the utilization of the reserve supply of water to cool the exhaust steam, this arrangement deriving also the advantage of pre-heating said water.

Energy is also conserved by utilizing the heat of the exhaust gases from the internal combustion engine to supplement the electric heater in making steam.

What I claim is:—

1. In a vehicle power plant, a steam boiler, a heater disposed in the upper portion of said boiler, means for discharging feed water upon said heater, a second heater spaced below the first mentioned heater, and means for automatically maintaining the water level in said boiler below the lowermost heater.

2. In a vehicle power plant, the combination with a steam engine, means for driving a vehicle from said engine, a steam boiler, means for delivering steam to said engine from said boiler, an internal combustion engine, means for transforming the energy of said combustion engine into heat and for applying such heat to said boiler, a pump driven by said steam engine, a pump driven by said internal combustion engine, means for cutting off the drive to the last named pump, and delivery connections from each of said pumps to said boiler.

In testimony whereof I sign this specification.

JOHN A. HARRIS.